(12) United States Patent
Villegas Muriel et al.

(10) Patent No.: US 12,337,809 B2
(45) Date of Patent: Jun. 24, 2025

(54) STOWABLE VEHICLE PEDAL SYSTEM AND METHOD

(71) Applicant: Ford Global Technologies, LLC, Dearborn, MI (US)

(72) Inventors: Roberto Villegas Muriel, Atizapan de Zaragoza (MX); Harbind S. Chahal, Novi, MI (US); Andrew Stoscup, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 18/121,088

(22) Filed: Mar. 14, 2023

(65) Prior Publication Data

US 2024/0308481 A1    Sep. 19, 2024

(51) Int. Cl.
*B60T 7/06* (2006.01)
*B60K 26/02* (2006.01)

(52) U.S. Cl.
CPC .............. *B60T 7/06* (2013.01); *B60K 26/02* (2013.01); *B60K 2026/026* (2013.01)

(58) Field of Classification Search
CPC .......... B60T 7/042; B60T 7/06; B60K 26/02; B60K 2026/026
USPC .......................................................... 701/49
See application file for complete search history.

(56) References Cited

U.S. PATENT DOCUMENTS

| | | | |
|---|---|---|---|
| 7,044,019 B2 * | 5/2006 | Hauschopp | G05G 1/30 74/512 |
| 10,988,097 B2 * | 4/2021 | Ghaffari | B60R 21/09 |
| 10,994,611 B1 * | 5/2021 | Kim | G05G 5/28 |
| 11,009,903 B1 * | 5/2021 | Kim | B60T 7/06 |
| 11,036,252 B1 * | 6/2021 | McKeefery | B60K 26/021 |
| 11,099,596 B2 | 8/2021 | Kihara et al. | |
| 11,312,236 B1 | 4/2022 | Kim | |
| 2005/0057087 A1 * | 3/2005 | Ahnafield | G05G 1/46 303/20 |
| 2006/0070485 A1 * | 4/2006 | Revelis | G05G 5/24 74/540 |
| 2007/0137400 A1 * | 6/2007 | Campbell | G05G 1/38 74/513 |
| 2013/0247554 A1 * | 9/2013 | Cooper | G05G 1/487 60/407 |

(Continued)

FOREIGN PATENT DOCUMENTS

| | | | | |
|---|---|---|---|---|
| AU | 2011226993 A1 * | 1/2013 | ............. | B60T 7/042 |
| AU | 2013201516 A1 * | 10/2014 | ............. | B60K 26/02 |

(Continued)

*Primary Examiner* — Atul Trivedi
(74) *Attorney, Agent, or Firm* — Lorne Forsythe; Price Heneveld LLP (57) ABSTRACT

A stowable pedal system for a motor vehicle is provided. The stowable pedal system for a motor vehicle includes a foot pedal configured to be actuated by a user in a deployed position and further actuatable to a stowed position and the deployed position, and a sensor assembly sensing a sensed position of the foot pedal. The system also includes a controller configured to process the sensed position from the sensor assembly and command a vehicle operation in the deployed position and further processing the sensed signal during a stow or deploy operation to determine a stowed or deployed status of the foot pedal and generating an output signal indicative of the stowed or deployed status.

20 Claims, 9 Drawing Sheets

(56) References Cited

U.S. PATENT DOCUMENTS

| | | | | |
|---|---|---|---|---|
| 2013/0338894 | A1* | 12/2013 | Olofsson | B60T 7/042 |
| | | | | 701/70 |
| 2015/0008727 | A1* | 1/2015 | Kidera | B60T 13/662 |
| | | | | 303/16 |
| 2015/0142290 | A1* | 5/2015 | Van Saanen | G05G 1/32 |
| | | | | 74/478 |
| 2018/0065605 | A1* | 3/2018 | Leiber | B60T 8/368 |
| 2019/0016314 | A1* | 1/2019 | Sanders | B60T 13/662 |
| 2019/0389438 | A1* | 12/2019 | Lin | B60T 7/12 |
| 2020/0062233 | A1* | 2/2020 | Yu | B60T 13/662 |
| 2020/0317166 | A1 | 10/2020 | Ghaffari et al. | |
| 2020/0317167 | A1 | 10/2020 | Ghaffari et al. | |
| 2020/0398725 | A1* | 12/2020 | Mullen | B60N 3/044 |
| 2021/0318711 | A1* | 10/2021 | Camacho | B60K 26/02 |
| 2022/0048384 | A1* | 2/2022 | Kim | G05G 5/28 |
| 2022/0090656 | A1* | 3/2022 | Kodama | B60K 26/02 |
| 2022/0169116 | A1* | 6/2022 | Austermeier | G05G 5/05 |
| 2022/0297539 | A1* | 9/2022 | Sasaki | B60K 26/021 |
| 2022/0340007 | A1* | 10/2022 | Möller | B60K 26/021 |
| 2023/0023040 | A1* | 1/2023 | Kim | G05G 1/40 |
| 2023/0060925 | A1* | 3/2023 | Kinouchi | B60K 26/02 |
| 2023/0065963 | A1* | 3/2023 | Kinouchi | B60K 26/02 |
| 2023/0072963 | A1* | 3/2023 | Walton | B60K 26/02 |
| 2024/0174205 | A1* | 5/2024 | Miyata | B60T 17/22 |
| 2025/0050732 | A1* | 2/2025 | Snead | B60K 26/02 |

FOREIGN PATENT DOCUMENTS

| | | | | | |
|---|---|---|---|---|---|
| BR | 102021006982 | A2 | * | 12/2021 | B60K 26/02 |
| CN | 112172756 | A | * | 1/2021 | B60K 26/021 |
| CN | 112277906 | A | * | 1/2021 | B60T 13/142 |
| CN | 113784860 | A | * | 12/2021 | B60K 20/04 |
| CN | 114555400 | A | * | 5/2022 | B60K 20/04 |
| CN | 115107511 | A | * | 9/2022 | B60K 26/02 |
| DE | 102011050056 | A1 | * | 11/2012 | B60T 7/06 |
| DE | 102018203559 | A1 | | 9/2019 | |
| DE | 102020211830 | A1 | * | 10/2021 | B60R 21/09 |
| DE | 102020211829 | A1 | * | 12/2021 | B60K 26/02 |
| DE | 102021200548 | A1 | * | 2/2022 | B60K 26/02 |
| DE | 102021205317 | A1 | * | 5/2022 | B60T 7/042 |
| DE | 102021205404 | A1 | * | 5/2022 | B60K 26/02 |
| DE | 102020132845 | A1 | * | 6/2022 | |
| DE | 102022206407 | A1 | * | 4/2023 | B60K 26/02 |
| EP | 4407404 | A1 | * | 7/2024 | B60T 7/042 |
| KR | 100649166 | B1 | | 11/2006 | |
| KR | 20210131007 | A | * | 11/2021 | |
| KR | 20230086856 | A | | 6/2023 | |
| TW | 202436171 | A | * | 9/2024 | B63H 16/20 |
| WO | WO-2013000042 | A1 | * | 1/2013 | B60T 7/042 |
| WO | WO-2018079819 | A1 | * | 5/2018 | B60K 26/02 |
| WO | WO-2018079820 | A1 | * | 5/2018 | B60K 26/02 |
| WO | WO-2019108927 | A1 | * | 6/2019 | B60T 11/16 |
| WO | WO-2020165295 | A1 | * | 8/2020 | B60T 13/14 |
| WO | WO-2020180141 | A1 | * | 9/2020 | B60T 7/042 |
| WO | WO-2020196264 | A1 | * | 10/2020 | B60K 26/02 |
| WO | WO-2021023529 | A1 | * | 2/2021 | B60T 7/042 |

* cited by examiner

STOWABLE VEHICLE PEDAL SYSTEM AND METHOD

FIELD OF THE DISCLOSURE

The present disclosure generally relates to vehicle mounted foot pedals, and more particularly relates to stowable vehicle foot pedals for a motor vehicle.

BACKGROUND OF THE DISCLOSURE

Motor vehicles are commonly equipped with a foot pedal system having a set of driver actuatable foot pedals, typically including an accelerator foot pedal and a brake foot pedal, for example. In many motor vehicles, the foot pedals are generally fixed or adjustable in position. In some vehicles, such as an autonomous vehicle, the foot pedals have been proposed to move between a deployed position for manual driving use and a stowed position when the foot pedals are not needed. It may be desirable to provide for stowable foot pedals on a vehicle that deploy and stow effectively.

SUMMARY OF THE DISCLOSURE

According to a first aspect of the present disclosure, a stowable pedal system for a motor vehicle is provided. The pedal system includes a foot pedal configured to be actuated by a user in a deployed position and further actuatable to a stowed position and the deployed position, a sensor assembly sensing a sensed position of the foot pedal, and a controller configured to process the sensed position from the sensor assembly and command a vehicle operation in the deployed position and further processing the sensed signal during a stow or deploy operation to determine a stowed or deployed status of the foot pedal and generating an output signal indicative of the stowed or deployed status.

Embodiments of the first aspect of the present disclosure can include any one or a combination of the following features:
- an actuator for actuating the foot pedal to the stowed and deployed positions;
- the foot pedal comprises a brake pedal for controlling actuation of a brake system of the motor vehicle;
- the foot pedal comprises an accelerator pedal for controlling acceleration of the motor vehicle;
- the sensor assembly comprises an angle sensor for sensing rotational movement of the foot pedal;
- a distance sensor for sensing a distance of movement of the foot pedal;
- the controller determines an incorrect stow position or deploy position based on the distance sensed with the distance sensor;
- the first pedal comprises a control arm and a footpad;
- the sensor assembly including a first spring and a first distance sensor operatively coupled to the footpad and a second spring and a second distance sensor operatively coupled to the control arm; and
- the first spring has a first spring constant and the second spring has a second spring constant which is greater than the first spring constant.

According to a second aspect of the present disclosure, a method of controlling a stowable pedal system in a motor vehicle is provided. The method includes the steps of sensing a sensed position of a foot pedal with a sensor assembly and generating a sensor output, processing the sensor output to generate a vehicle operation command when the foot pedal is in a deployed position, and performing the commanded vehicle operation. The method also includes the steps of actuating the foot pedal to a stowed position during a stow operation and the deployed position during a deploy operation, processing the sensor output during the stow or deploy operation to determine a status of the deployed or stowed position of the foot pedal, and generating an output indicative of the stowed or deployed status.

Embodiments of the second aspect of the present disclosure can include any one or a combination of the following features:
- the step of actuating the foot pedal comprises operating a motor to stow or deploy the foot pedal;
- the first pedal comprises a brake pedal and the step of performing the commanded vehicle operation comprises braking the motor vehicle;
- the first pedal comprises an accelerator pedal and the step of performing the commanded vehicle operation comprises accelerating the motor vehicle;
- the sensor assembly comprises an angle sensor for sensing rotational movement of the foot pedal;
- the sensor assembly comprises a distance sensor for sensing a distance of movement of the foot pedal;
- determining an incorrect stow or deploy position based on the distance sensed with the distance sensor;
- the foot pedal comprises a control arm and a footpad;
- the sensor assembly comprises a first spring and first distance sensor operatively coupled to the footpad and a second spring and a second distance sensor operatively coupled to the control arm; and
- the first spring has a first spring constant and the second spring has a second spring constant which is greater than the first spring constant.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
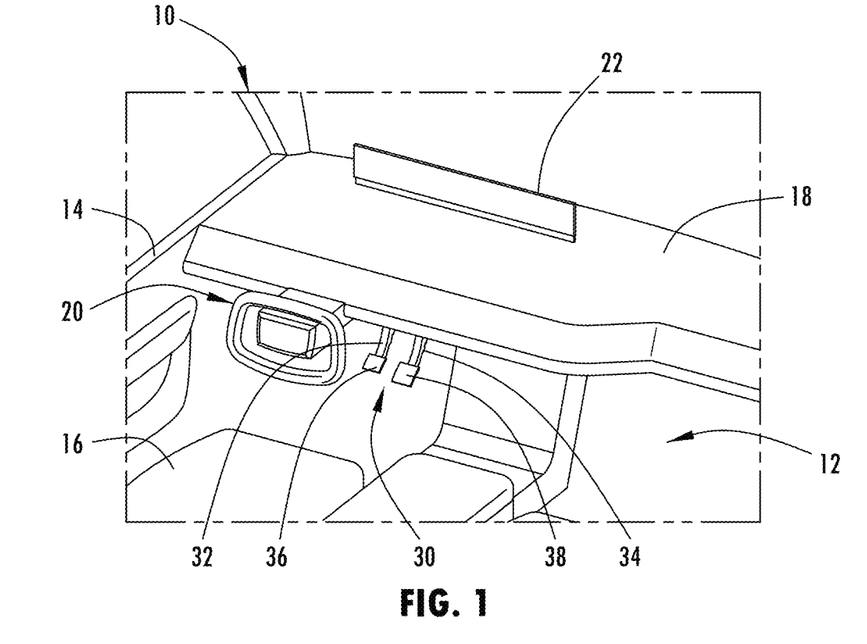
FIG. 1 is a rear perspective view of the front side of a cabin interior of a motor vehicle having a stowable foot pedal system, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a stowable vehicle foot pedal system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10 is generally illustrated configured with passenger seating for transporting one or more passengers including a driver of the vehicle 10 and one or more passengers, according to one example. The motor vehicle 10 has a vehicle body that generally defines a cabin interior 12. The cabin interior 12 may contain various features and trim components. The cabin interior 12 is shown having an arrangement of seats including a front driver seat 16 located rearward of a steering wheel 20 which is generally disposed on and extends rearward from a dashboard 18.

The motor vehicle 10 is equipped with a stowable foot pedal system 30 that includes one or more foot pedals that are actuatable to control operation of the motor vehicle 10. The foot pedal system 30 may include a first foot pedal 32 configured as a brake pedal for controlling brake actuation of the motor vehicle 10. A second foot pedal 34 may be included for controlling acceleration of the motor vehicle 10. The first and second foot pedals 32 and 34 have first and second footpads 36 and 18, respectively, configured to be engaged by a foot of a driver of the motor vehicle 10 seated in seat 16 to apply force to depress the corresponding foot pedal to perform a vehicle control operation, such as braking the vehicle 10 or accelerating the vehicle 10. The foot pedal system 30 is shown having the foot pedals 32 and 34 shown extending vehicle rearward in the deployed use position to allow a driver of the motor vehicle 10 to drive the motor vehicle 10 in a manual operation mode by selectively depressing the first and second foot pedals 32 and 34 with the driver's foot when needed.

It should be appreciated that the motor vehicle 10 may be an autonomous vehicle that may operate without driver assistance or with limited driver assistance from the driver. In an autonomous vehicle, the stowable foot pedal system 30 may be actuated via an actuator to move the foot pedals 32 and 34 to a stowed position when the pedals 32 and 34 are not needed to operate the motor vehicle 10. This may occur when the motor vehicle 10 is locked out in park and not moving or when full autonomous vehicle control is safe and permissible. While modern OEMs of passenger vehicles would currently warn against stowing the foot pedals while the vehicle is in motion due to safety concerns, it is anticipated that technology and the regulatory framework may evolve in the future to where such an activity is safe and permissible.

The foot pedal system 30 is shown in FIG. 1 having the first and second foot pedals 32 and 34 generally mounted to the lower side of the dashboard 18, according to one example. It should be appreciated that the first and second foot pedals 32 and 34 may otherwise be mounted at another location, such as the floor, according to another example. In the deployed use position, the foot pedals 32 and 34 extend vehicle rearward towards the driver seat 16 and are positioned to be engaged by the driver's foot. When the foot pedals 32 and 34 are not needed, the first and second pedals 32 and 34 may be actuated via an actuator to move to the stowed position which may be rotated vehicle forward towards and abutting with the lower part of the dashboard 18 or structure therebelow, such as the floor.

The motor vehicle 10 is further shown having a display 22 which may include a touchscreen display that may serve as a human machine interface (HMI) to receive inputs and provide outputs. The display 22 is shown located on top of the dashboard 18, generally forward of the steering wheel 20 and viewable from the driver's seat, however, the display 22 may be located elsewhere on the vehicle 10 such as forward of a center console, for example. The display 22 may display vehicle information including outputs to the driver of the motor vehicle 10. For example, the display 22 may display one or more outputs to the driver indicating the status of the foot pedal system 30, such as whether the first and second foot pedals 32 and 34 are properly fully deployed or properly fully stowed, for example. If a foot pedal is not properly fully deployed or fully stowed, the display 22 may provide instructions to the driver such as to check for an obstruction or initiate a repeated stow or deploy operation. It should be appreciated that other HMI devices such as a sound system having one or more audio speakers may be employed to provide such outputs.

Figure 2:
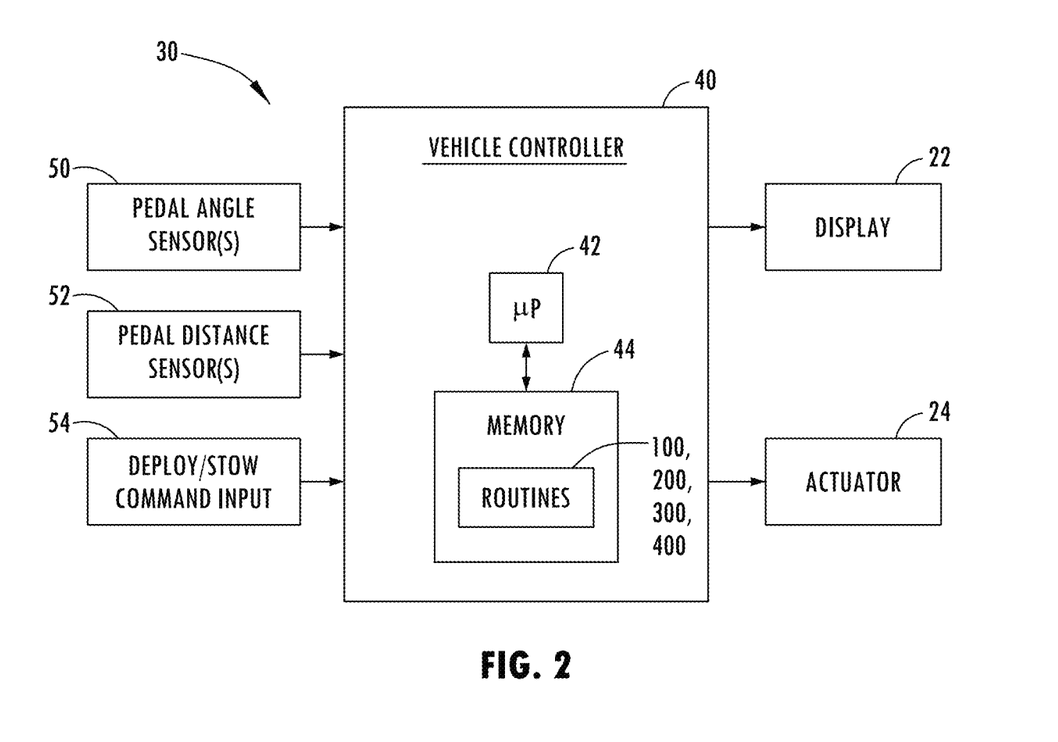
FIG. 2 is a block diagram illustrating the foot pedal system having a controller configured to control the stow and deploy operations of the foot pedals.

Referring to FIG. 2, the vehicle foot pedal system 30 is illustrated having a vehicle controller 40 for receiving one or more sensor generated inputs and user inputs and generating outputs such as control signals to control an actuator 24 or provide output signals to the display 22 or other HMI. The vehicle controller 40 may include control circuitry such as a microprocessor 42 and memory 44. Stored within memory 44 and executed by the microprocessor 42 are one or more routines, such as routines 100, 200, 300 and 400 as shown and described herein. It should be appreciated that the vehicle controller 40 may include other analog and/or digital control circuitry to monitor and control the foot pedal system 30 and provide output control signals.

The vehicle controller 40 is shown receiving pedal sensor signals as inputs including an angle signal from a pedal angle sensor 50 that measures the angle of a foot pedal and a distance signal from a pedal distance sensor 52 which measures a distance of travel of the foot pedal. It should be appreciated that each of the foot pedals may include one or more pedal angle sensors 50 and/or one or more pedal distance sensors 52, according to various embodiments and examples as shown and described herein. In addition, the vehicle controller 40 receives a deploy/stow command input 54 from the user. It should be appreciated that the deploy/stow command input 54 may be input via any input device, such as via the touchscreen display 22, voice activation, inputs provided via remote devices such as a key fob or phone, or other user inputs. In some embodiments, the vehicle controls may generate the stow and deploy command signals. The vehicle controller 40 processes the various inputs and generates one or more control signals that may be provided to the pedal actuators 24 to actuate each of the pedals to move the pedals between stowed and deployed positions. In addition, the vehicle controller 40 may generate one or more output signals to be displayed on the display 22 to indicate the status of the pedal system or provide instructions to the driver.

Figure 3A:
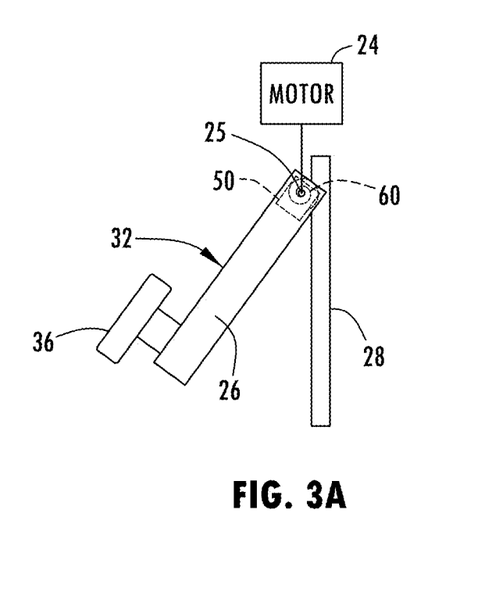
FIG. 3A is a schematic side view of one embodiment of a foot pedal having an angle sensor and positioned in the deployed use position.
Figure 3B:
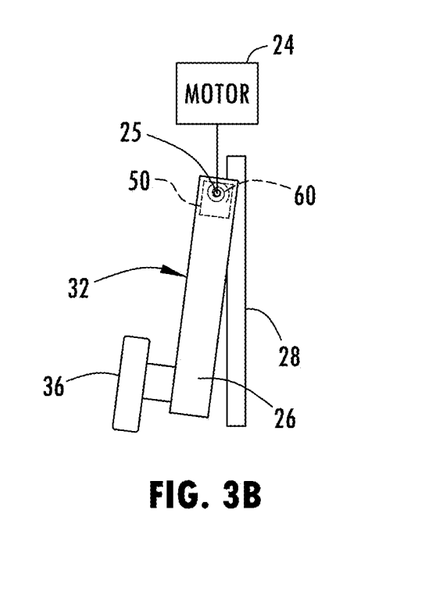
FIG. 3B is a schematic side view of the foot pedal of FIG. 3A shown in the stowed position.

Referring to FIGS. 3A and 3B, the first foot pedal 32 of the pedal system 30 is illustrated having a pedal angle sensor 50, according to a first embodiment. It should be appreciated that the second foot pedal 34 may be configured the same or similar to the first foot pedal 32 in each of the embodiments shown and described herein. In this embodiment, the foot pedal 32 is pivotally mounted at one end to a rear support wall 28 which may be a bracket, an arm or other support. The foot pedal 32 includes an elongated control arm 26 having a footpad 36 assembled at the vehicle rearward facing lower end thereof. The footpad 36 is positioned to be engageable by a foot of a driver of the motor vehicle 10 when the pedal system 30 is in the deployed use position as shown in FIG. 3A. The upper end of control arm 26 is connected to a motor shaft 25 which is driven by an actuator, such as an electric motor 24, which may rotate the control arm 26 between the deployed use position shown in FIG. 3A and the stowed position shown in FIG. 3B in which the foot pedal 32 is rotated closer to the rear support wall 28. As such, the actuator, shown as electric motor 24, may actuate the foot pedal 32 between the stowed and deployed use positions.

The pedal angle sensor 50 is shown located proximate to the motor shaft 25 to sense the angle of rotation of the control arm 26 relative to the rear support wall 28. The pedal angle sensor 50 may include a spring, such as a torsion spring 60, that biases the foot pedal 32 towards the deployed use position. As such, a user may press with force on the footpad 36 to apply a commanded input such as a braking force and, upon removal of the braking force, the foot pedal 32 may be bias returned to the deployed use position via the torsion spring 60. When the electric motor 24 is activated to move the foot pedal 32 from the deployed use position to the stowed position, the torsion spring 60 is compressed.

The foot pedal system 30 in this embodiment employs a single pedal angle sensor 50 to measure the angle of rotation of the foot pedal 32. In another embodiment, two angle sensors may be mounted on the same axis to provide redundant signals. The foot pedal angle sensor 50 may be used during normal manual vehicle operation for either of the brake pedal or accelerator pedals to sense the angle when a driver is applying a force onto the footpad 36. The sensed angle may be used to control the braking or acceleration of the motor vehicle 10 based on the sensed angle which depends on the force applied to the foot pedal 32 and may generate a control output signal for braking the motor vehicle or accelerating the motor vehicle. In addition, when the foot pedal 32 is commanded to move between the stowed and deployed use positions in the stow or deploy modes of operation, and is not used to control the vehicle normal manual operation, the single pedal angle sensor 50 is used during the stow and deploy operations to sense the position of the foot pedal 32 to confirm that the foot pedal 32 is in either the fully deployed position or the fully stowed position. It should be appreciated that if a user, such as a driver of the vehicle, interferes with the movement of the foot pedal 32 during a deploy operation or stow operation, such as by applying a force to the foot pedal 32, or if another object interferes with movement of the foot pedal 32, the foot pedal 32 may not be fully deployed or fully stowed as desired. In such a situation, the pedal angle sensor is used to sense the angle to detect the foot pedal status and to inform the driver of any incorrect position of the foot pedal position and/or to initiate a repeated pedal stow or deploy operation.

Figure 4:
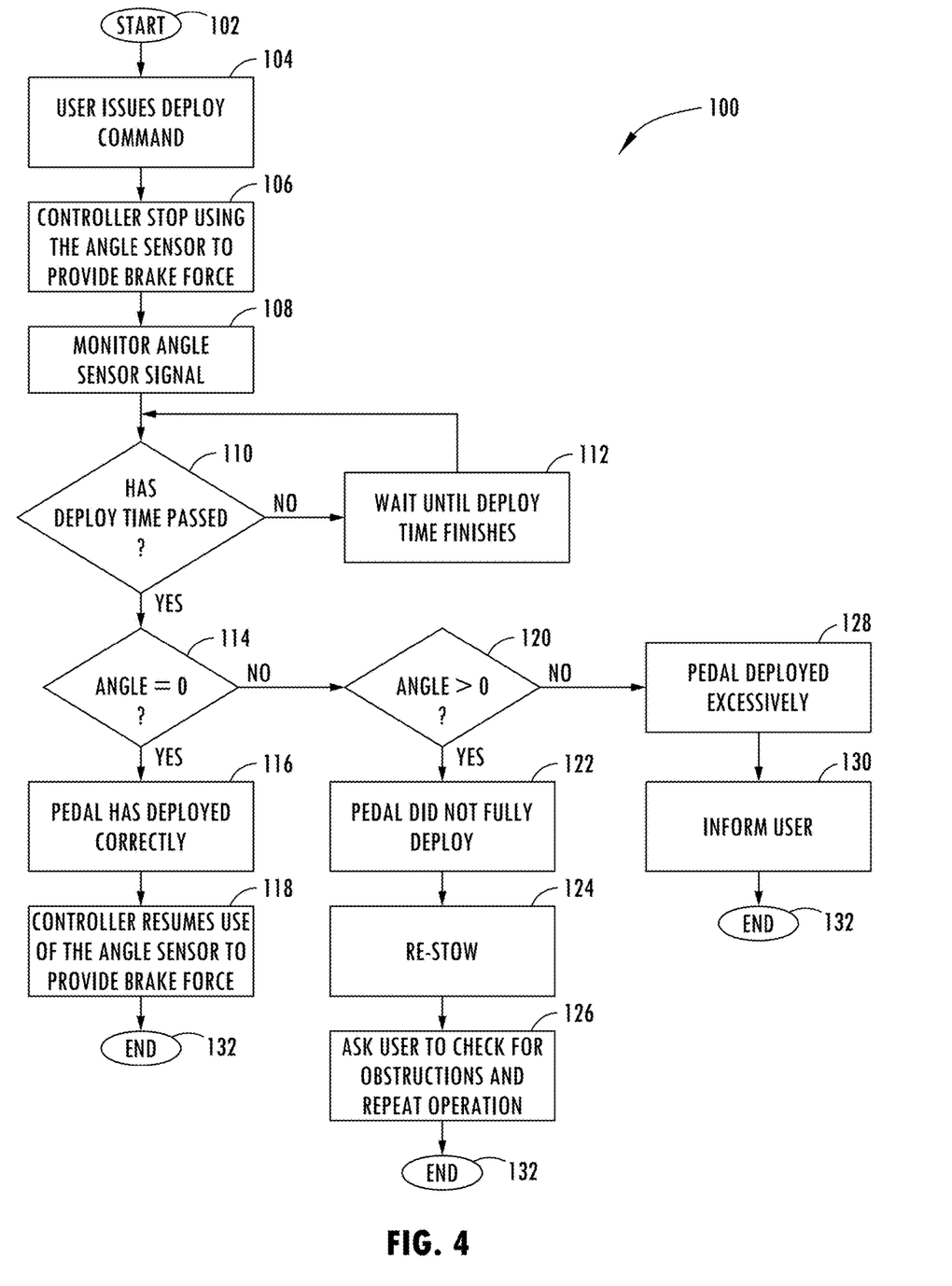
FIG. 4 is a flow diagram illustrating a method of monitoring and controlling the foot pedal system equipped with the foot pedal of FIG. 3A.

The foot pedal system 30 shown in FIGS. 3A and 3B, may be monitored and controlled by routine 100 illustrated in FIG. 4 for controlling a brake pedal during a pedal deploy operation. Routine 100 is shown beginning at step 102 and proceeding to step 104, where the user issues a deploy command to deploy the pedal system. Next, at step 106, the controller, such as a vehicle control module (VCM) or a brake control module (BCM) will stop using the pedal angle sensor to provide a brake force for the brake pedal. Next, the pedal angle sensor signal is monitored at step 108, and at decision step 110, routine 100 determines if a deploy time has passed and, if not, waits until the deploy time finishes at step 112. Once the deploy time has passed, routine 100 proceeds to decision step 114 to determine if the pedal angle signal is equal to zero which is a desired pedal angle in the fully deployed position. If the pedal angle signal is equal to zero, routine 100 proceeds to step 116 to indicate that the foot pedal has deployed correctly, and then to step 118 where the controller resumes use of the pedal angle sensor to provide a brake force during normal vehicle operation, before ending at step 132.

If the pedal angle signal is not equal to zero, routine 100 proceeds to decision step 120 to determine if the pedal angle signal is greater than zero. If the pedal angle signal is greater than zero, routine 100 proceeds to step 122 to indicate that the foot pedal did not fully deploy, and then to step 124 to command that the foot pedal be restowed. Next, routine 100 will request the user, such as the driver, to check for any obstructions and to repeat the pedal deploy operation, before ending at step 132.

If the pedal angle signal is not greater than zero, that is, the pedal angle is less than zero, then routine 100 proceeds to step 128 to indicate that the foot pedal has deployed excessively. Excessive deployment may result in the foot pedal being actuated to an angle beyond the deployment angle such that the pedal extends out excessively. When this occurs, routine 100 proceeds to step 130 to inform the user of the excessively deployed foot pedal, before ending at step 132. It should be appreciated that both foot pedals may be controlled similar to method 100 and that the foot pedals may be controlled to move to the stowed position in a similar manner.

Figure 5A:
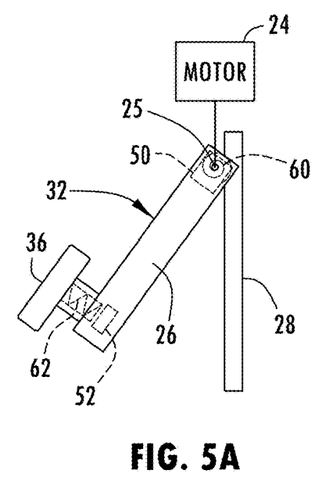
FIG. 5A is a schematic side view of another embodiment of a foot pedal having an angle sensor and a distance sensor with the foot pedal shown in the deployed use position.
Figure 5B:
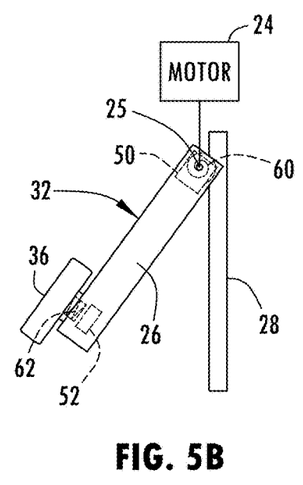
FIG. 5B is a schematic side view of the foot pedal of FIG. 5A with the foot pedal shown depressed in the use position.
Figure 5C:
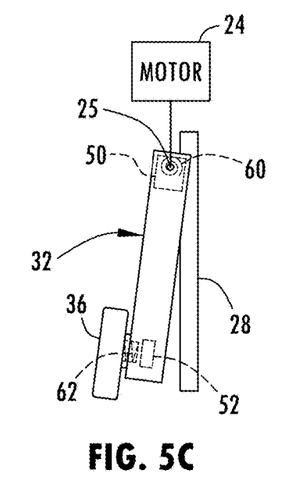
FIG. 5C is a schematic side view of the foot pedal shown in FIG. 5A with the pedal shown in the stowed position and with force applied to the footpad.

Referring to FIGS. 5A-5C, a foot pedal 32 of the foot pedal system 30 is illustrated having a pedal angle sensor 50 and a pedal distance sensor 52 according to a second embodiment. In this embodiment, the pedal angle sensor 60 is located proximate to the motor shaft 25 which is coupled to the electric motor 24 which actuates the control arm 26 between the deployed and stowed positions similar to the motor and angle sensor arrangement described above in connection with the first embodiment. The control arm 26 is pivotally mounted relative to the rear support wall 28. In this embodiment, the footpad 36 is linearly movable relative to the control arm 26 via a coil spring 62. In addition, the pedal sensor 52 is positioned to sense the linear distance movement of the footpad 36 relative to control arm 26 when force is applied to the footpad 36 to compress the coil spring 62. As such, pressure or force applied to the foot pedal 36 by a driver, for example, or resistance applied by an interfering object may be sensed by measuring movement with the linear distance sensor 52 in addition to the angular sensor measurement from the pedal angle sensor 50. The sensed angle signal and distance signal may be processed by the controller to determine a commanded input to the foot pedal, such as a braking command signal for the brake system to brake the motor vehicle during normal braking operation. In addition, the pedal angle sensor and pedal distance sensor 50 and 52 may be employed during the stow and deploy operations to confirm proper deployment of the foot pedal to either the stowed or deployed positions.

As seen in FIG. 5A, the foot pedal 32 is shown in the fully deployed position. When a user applies force to the footpad 36, the footpad 36 may move linearly towards control arm 26 to compress the coil spring 62 and the movement distance of the footpad 36 relative to control arm 26 is sensed by the pedal distance sensor 52 which is further shown in FIG. 5B. When the pedal system is commanded to move to a stowed position as seen in FIG. 5C, the control arm 26 is actuated via motor 24 to move towards the rear wall 28. If a force is applied to the footpad 36 during movement to the stowed position, the proper position of the foot pedal 32 may not be achieved. When this occurs, the pedal system senses the interfering stow event by monitoring the angle and distance signals and provides an output to the operator and/or a command to repeat the stow process.

Figure 6:
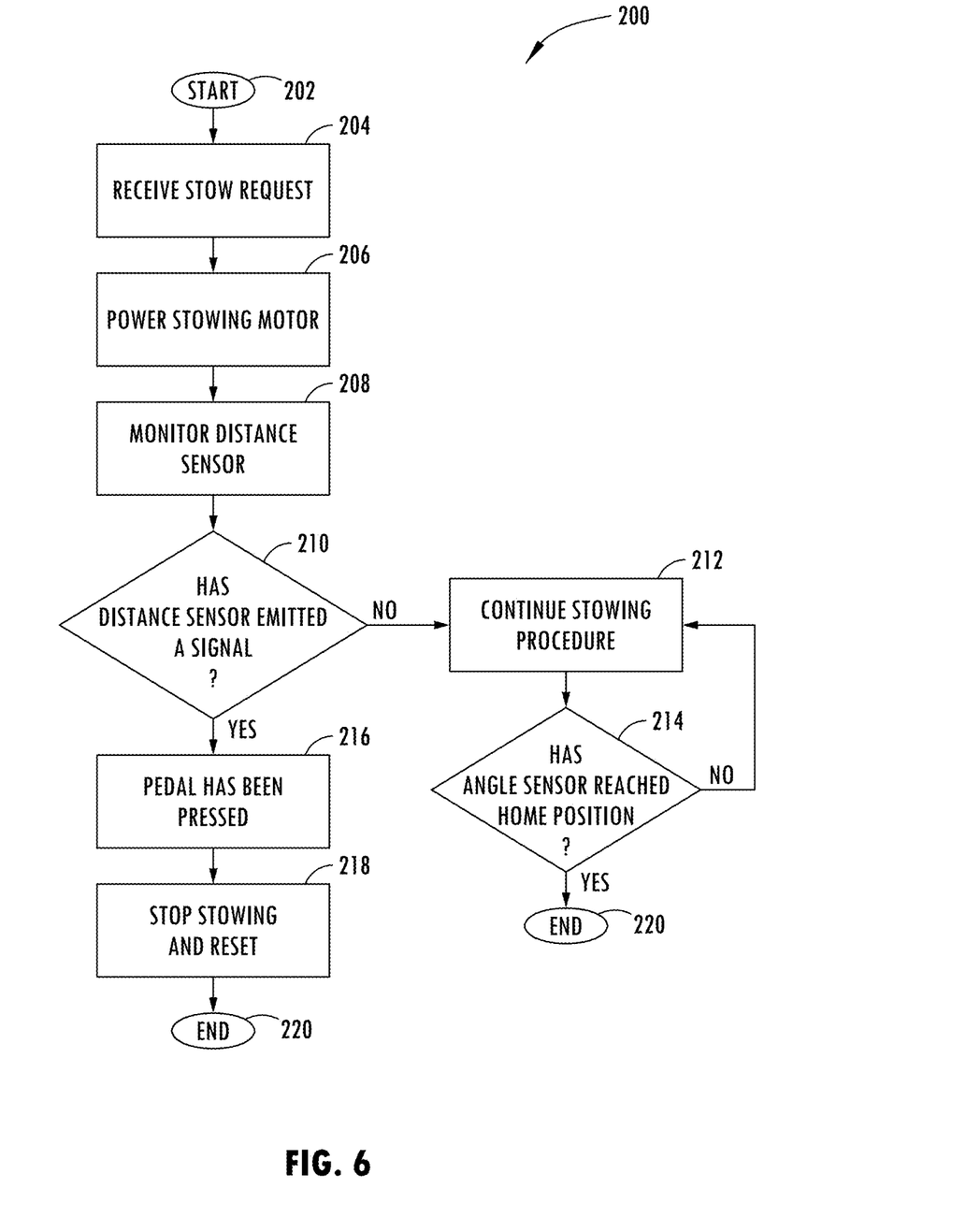
FIG. 6 is a flow diagram illustrating a method of monitoring and controlling the foot pedal system equipped with the foot pedal of FIG. 5A.

Referring to FIG. 6, a routine 200 for controlling the pedal system shown in FIGS. 5A-5C during a pedal stow operation is illustrated. Routine 200 begins at step 202 and proceeds to step 204 to receive a stow request from a user or the vehicle. Next, at step 206, routine 200 begins to activate the power stowing motor to actuate the foot pedal to the stowed position. Next, at step 208, routine 200 monitors the pedal distance sensor 52 and, at decision step 210 determines if the pedal distance sensor has emitted a signal, which is indicative of a force applied to the footpad. If this occurs, routine 200 determines that the foot pedal has been forcibly pressed or interfered with at step 216 and stops the stow operation, and then resets the stow process at step 218, before ending at step 220.

If no signal has been emitted by the pedal distance sensor indicative of force applied to the footpad, routine 200 proceeds to step 212 to continue the pedal stowing operation. Next, at decision step 214, routine 200 determines if the pedal angle sensor has reached a home position and, if not, returns to step 212. Once the pedal angle sensor has reached the home position, routine 200 ends at step 220. It should be appreciated that the foot pedal shown in the embodiment of FIGS. 5A and 5B may be controlled to deploy the foot pedal in a similar but reverse motion manner.

Figure 7:
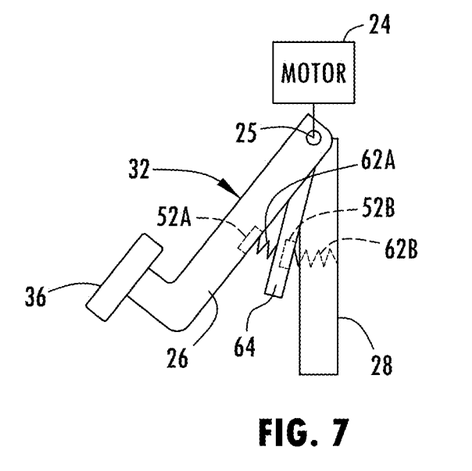
FIG. 7 is a schematic side view of a further embodiment of a foot pedal having a pair of position sensors and in the deployed use position.
Figure 8:
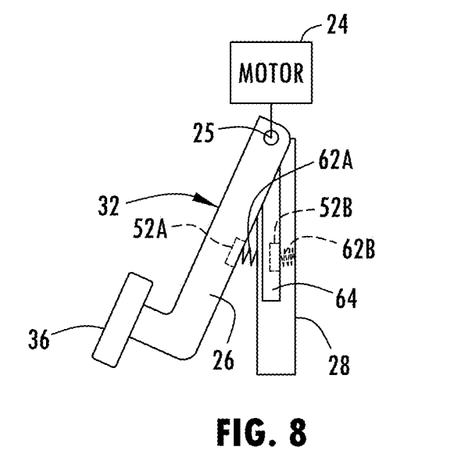
FIG. 8 is a schematic side view of the foot pedal shown in FIG. 7 with the foot pedal shown in the stowed position.

Referring to FIGS. 7 and 8, the foot pedal 32 of the pedal system 30 is illustrated employing first and second pedal distance sensors 52A and 52B, according to a third embodiment. In this embodiment, the foot pedal 32 has a control arm 26 that pivots at an upper end about a motor shaft 25 actuated by electric motor 24 relative to the rear wall 28. In addition, an intermediate arm 64 extends between the control arm 26 and the rear wall 28. The intermediate arm 64 is pivotally connected to a pivot point at or near the motor shaft 25. A first linear compression coil spring 62A is disposed between the intermediate arm 64 and control arm 26, and a second linear compression coil spring 62B is disposed between the intermediate arm 64 and the rear wall 28. A first pedal distance sensor 52A is disposed on the control arm 26 to measure linear distance movement between the control arm 26 and the intermediate arm 64 proximate to the first linear compression coil spring 62A. In addition, a second pedal distance sensor 52B is disposed on the intermediate arm 64 to measure linear distance movement between the intermediate arm 64 and the rear wall 28 proximate to the second linear compression coil spring 62B. As such, the first and second pedal distance sensors 52A and 52B sense the change in distance between the control arm 26 and intermediate arm 64 and further between the intermediate arm 64 and rear wall 28 as the pedal assembly moves between a deployed position shown in FIG. 7 and a stowed position shown in FIG. 8.

It should be appreciated that the first and second pedal distance sensors 52A and 52B are used during normal vehicle operation, such as for a brake pedal braking operation to sense the position of the brake arm when a braking force is applied to the footpad 36. By sensing the linear displacement sensed by the first and second distances, the sensors, the position of the pedal and force applied to the footpad may be sensed. It should be appreciated that first linear compression coil spring 62A has a first spring constant and the second linear compression coil spring 62B has a second spring constant, and that the first and second spring constants are different from one another, such that the second linear compression coil spring 62B compresses prior to the first linear compression coil spring 62A as shown in FIG. 8. As such, when the foot pedal is moved to the stowed position shown in FIG. 8, the second linear compression coil spring 62B is fully compressed and the first linear compression coil spring 62A is not fully compressed without added force applied to the footpad 36.

Figure 8A:
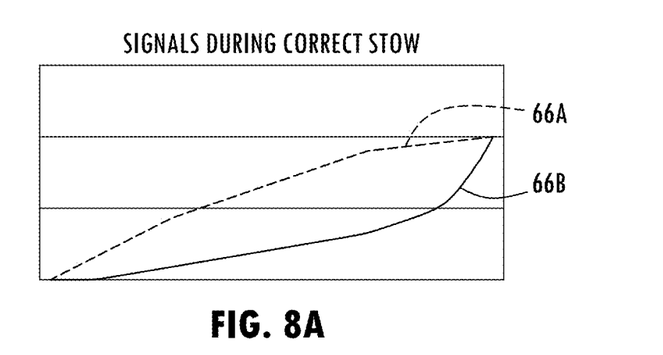
FIG. 8A is a graph illustrating signals sensed with the pair of distance sensors in FIG. 7 during a stow operation.
Figure 8B:
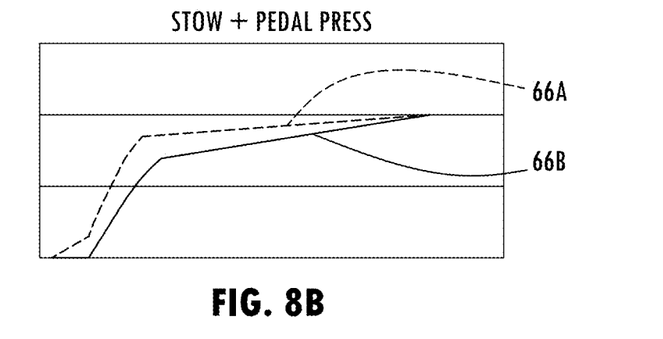
FIG. 8B is a graph illustrating the signals sensed with the pair of distance sensors shown in FIG. 7 when the foot pedal is being stowed and the footpad is pressed.

Referring to FIG. 8A, the first and second signals sensed with the first and second pedal distance sensors 52A and 52B are illustrated in one example. Signal 66A indicates a signal sensed with the first pedal distance sensor 52A during a correct stow operation of the foot pedal shown in FIGS. 7 and 8, whereas the second signal 66B indicates the signal sensed with the second pedal distance sensor 52B during the stow operation. Referring to FIG. 8B, the first and second signals 68A and 68B are shown during the stow operation when a force is applied to the foot pedal. In this situation, both of the first and second linear compression coil springs are compressed and the pedal system determines that the stow operation may not be correct based on the signal responses and may issue an output and/or restart the stow operation.

Figure 9:
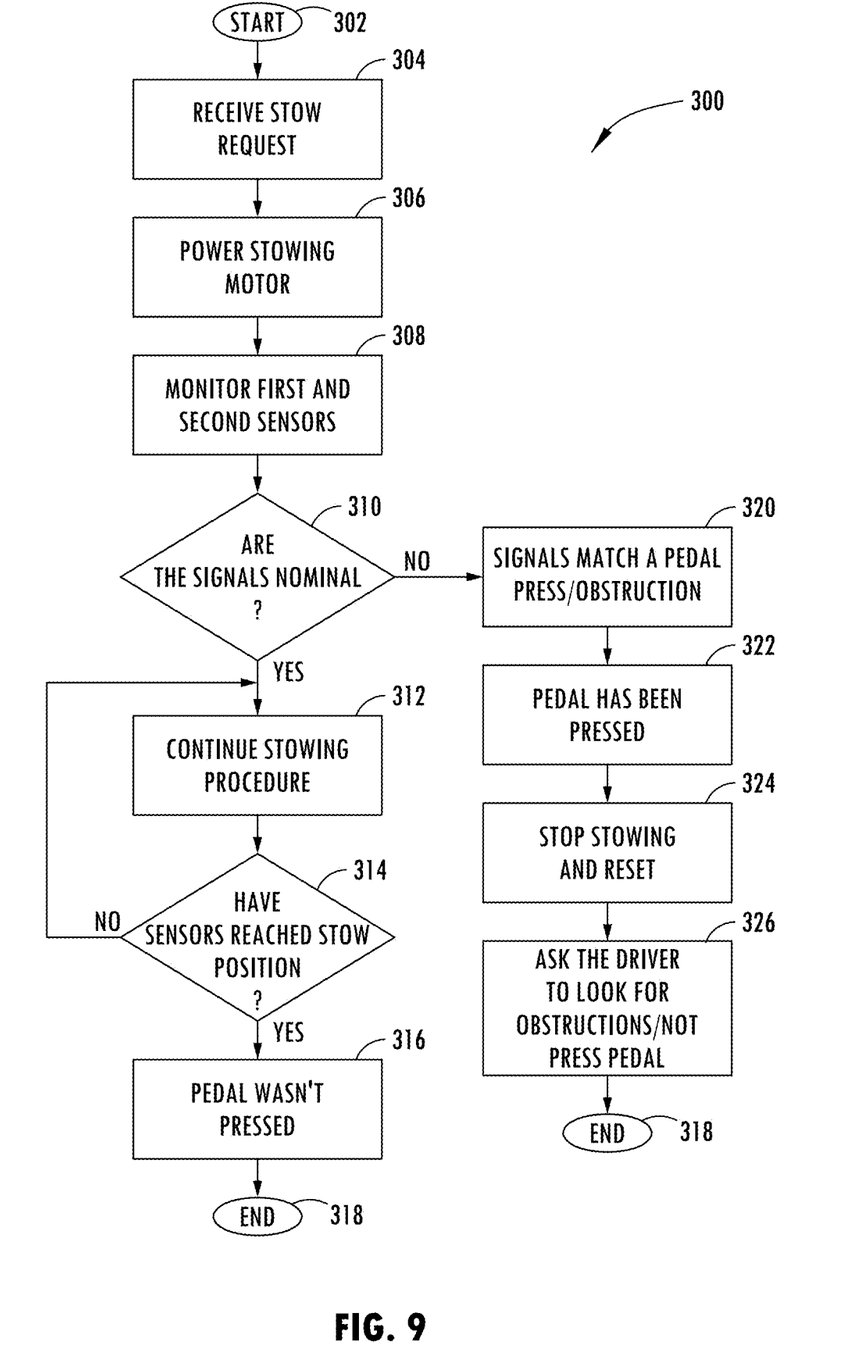
FIG. 9 is a flow diagram illustrating a routine for monitoring and controlling the stowable foot pedal of FIG. 8, according to one example.

Referring to FIG. 9, a routine 300 for controlling the pedal system 30 according to the embodiment shown in FIGS. 7 and 8 is illustrated. Routine 300 begins at step 302 and proceeds to step 304 to receive a stow request command input to perform the pedal stow operation. Next, at step 306, routine 300 initiates the stow operation with the power stowing motor and, at step 308, the first and second pedal sensor signals are monitored. Routine 300 then proceeds to decision step 310 to determine if the signals monitored are nominal and, if so, continues the stowing procedure at step 312. This occurs until decision step 314 determines that the first and second sensor signals have reached sensor values indicative of the stowed position. When the sensor signals generate values indicative of the correct stowed position, routine 300 determines that the foot pedal was not pressed at step 316 before ending at step 318. If the sensor signal does not reach stowed position values in step 314, routine 300 returns to step 312.

If both of the sensor signals are not nominal as determined in decision step 312, routine 300 proceeds to step 320 to indicate that the signals match or indicate a pedal press/obstruction, and then proceeds to step 322 to indicate that the foot pedal has been pressed. Next, routine 300 proceeds to step 324 to stop the stowing process and to reset the foot pedal to the deployed use position. Routine 300 then proceeds to step 326 to ask the driver to look for obstructions and to not depress the foot pedal before ending at step 318. The stow operation may thereafter be repeated.

Figure 10A:
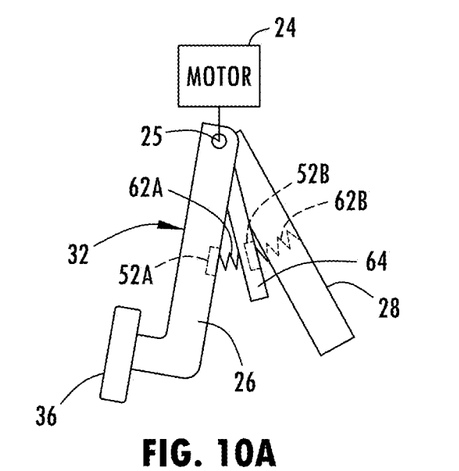
FIG. 10A is a schematic side view of the foot pedal of FIG. 7 with the foot pedal in a stowed position and force applied to the footpad.
Figure 10B:
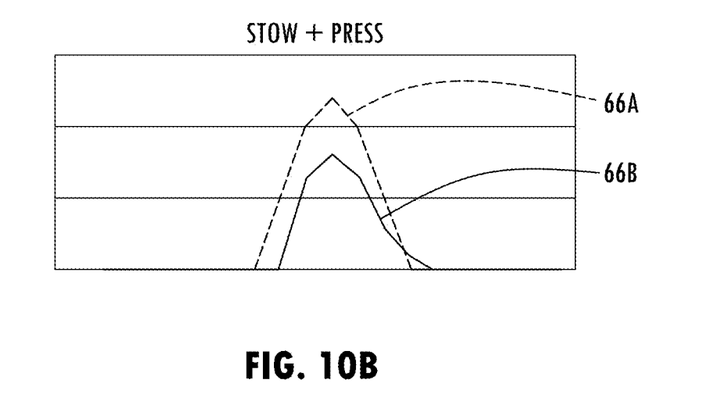
FIG. 10B is a graph illustrating the signals sensed with the pair of distance sensors for the foot pedal shown in FIG. 10A.

Referring to FIG. 10A, the foot pedal 32 of FIGS. 7 and 8 is illustrated, according to another scenario in which the rear mounted wall is forcibly actuated vehicle forward during a stow operation with a foot press, according to one example. When this occurs, the sensed signals 66A and 66B sensed by pedal distance sensors 52A and 52B, respectively, are shown in FIG. 10B in which the wall is sensed. This situation may be identified and the pedal system controlled by comparing the sensed signals 66A and 66B in FIG. 10B to the signals response in FIG. 10A.

Figure 11:
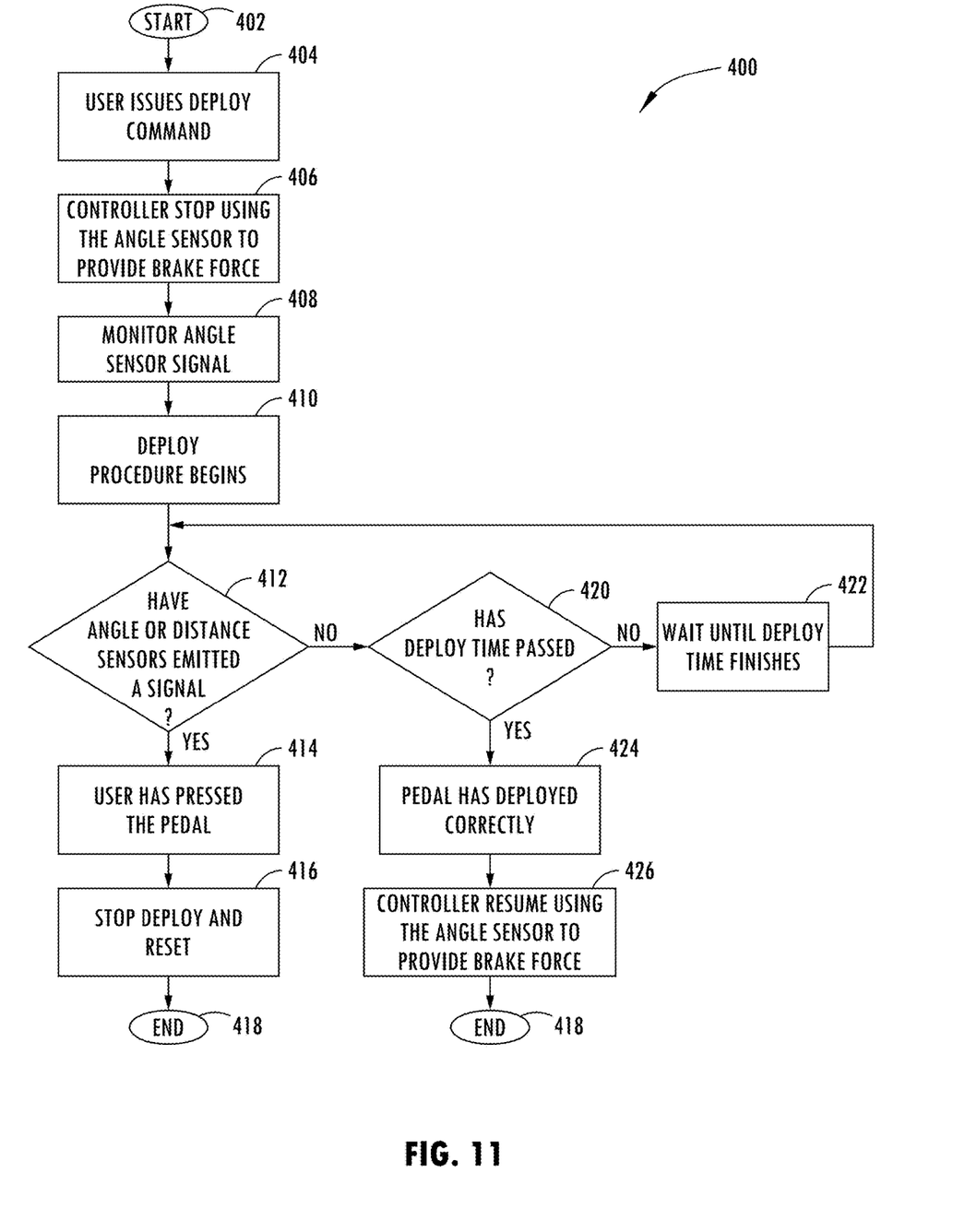
FIG. 11 is a flow diagram illustrating a routine for monitoring and controlling the pedal system with the foot pedal of FIG. 5A during a deploy operation.

Referring to FIG. 11, a routine 400 for deploying the foot pedal 32 of the pedal system 30 shown in FIGS. 5A-5C is shown according to one example. Routine 400 begins at step 402 and proceeds to step 404 where the user issues a deploy command to deploy the foot pedals. Routine 400 also has the controller stop using the angle sensor to provide the brake force. Routine 400 then proceeds to step 408 to monitor the angle sensor signal and proceeds to step 410 to activate the pedal deploy operation.

Routine 400 then proceeds to decision step 412 to determine if either of the angle and distance sensors 52A and 52B have emitted a signal and, if so, determines that the user has pressed the pedal at step 414 and proceeds to step 416 to stop the deploy operation and to reset the foot pedal to the stowed position before ending at step 418. If neither of the angle and distance sensors have emitted a signal, routine 400 proceeds to decision step 420 to determine if a deploy time has passed and, if not, waits until the deployed time finishes at step 422. Once the deploy time has passed, routine 400 proceeds to step 424 to determine if the pedal has been deployed correctly and then proceeds to step 426 where the controller resumes using the angle sensor to provide a brake force, request before ending at step 418.

Accordingly, the vehicle pedal system 30 advantageously provides for one or more sensors for detecting the position of a foot pedal 32 and employs the sensor signal or signals to control the normal operation of the pedal assembly such as for braking the vehicle, and further employs the pedal sensor signals during a stow or deploy operation to deploy or stow the foot pedals and provides corrective action such as an output or repeated attempt to deploy or stow the foot pedals when needed.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A stowable pedal system for a motor vehicle, the pedal system comprising:
    a foot pedal configured to be actuated by a user in a deployed position and further actuatable to move the foot pedal during a stow foot pedal operation to a stowed position and during a deploy foot pedal operation to the deployed position;
    a sensor assembly sensing a sensed position of the foot pedal; and
    a controller configured to process the sensed position from the sensor assembly and command a vehicle operation based on the sensed position of the foot pedal in the deployed position and further processing the sensed signal during the stow or deploy foot pedal operation to determine a stowed or deployed status of the position of the foot pedal based on the sensed position of the foot pedal and generating an output signal indicative of the stowed or deployed status of the position of the foot pedal.

2. The pedal assembly of claim 1 further comprising an actuator for actuating the foot pedal to the stowed and deployed positions.

3. The pedal system of claim 1, wherein the foot pedal comprises a brake pedal for controlling actuation of a brake system of the motor vehicle.

4. The pedal system of claim 1, wherein the foot pedal comprises an accelerator pedal for controlling acceleration of the motor vehicle.

5. The pedal system of claim 1, wherein the sensor assembly comprises an angle sensor for sensing rotational movement of the foot pedal.

6. The pedal assembly of claim 5 further comprising a distance sensor for sensing a distance of movement of the foot pedal.

7. The pedal assembly of claim 6, wherein the controller determines an incorrect stow position or deploy position based on the distance sensed with the distance sensor.

8. The pedal assembly of claim 1, wherein the first pedal comprises a control arm and a footpad.

9. The pedal assembly of claim 8, wherein the sensor assembly comprises a first spring and a first distance sensor operatively coupled to the footpad and a second spring and a second distance sensor operatively coupled to the control arm.

10. The pedal assembly of claim 9, wherein the first spring has a first spring constant and the second spring has a second spring constant which is greater than the first spring constant.

11. A method of controlling a stowable pedal system in a motor vehicle, the method comprising:
    sensing a sensed position of a foot pedal with a sensor assembly and generating a sensor output;
    processing the sensor output to generate a vehicle operation based on the sensed position of the foot pedal command when the foot pedal is in a deployed position;
    performing the commanded vehicle operation based on the sensed position of the foot pedal;
    actuating the foot pedal to a stowed position during a stow foot pedal operation and the deployed position during a deploy foot pedal operation;
    processing the sensor output during the stow or deploy foot pedal operation to determine a status of the deployed or stowed position of the foot pedal based on the sensed position of the foot pedal; and
    generating an output indicative of the status of the deployed or stowed position of the foot pedal.

12. The method of claim 11, wherein the step of actuating the foot pedal comprises operating a motor to stow or deploy the foot pedal.

13. The method of claim 11, wherein the first pedal comprises a brake pedal and the step of performing the commanded vehicle operation comprises braking the motor vehicle.

14. The method of claim 11, wherein the first pedal comprises an accelerator pedal and the step of performing the commanded vehicle operation comprises accelerating the motor vehicle.

15. The method of claim 11, wherein the sensor assembly comprises an angle sensor for sensing rotational movement of the foot pedal.

16. The method of claim 15, wherein the sensor assembly comprises a distance sensor for sensing a distance of movement of the foot pedal.

17. The method of claim 11 further comprising the step of determining an incorrect stow or deploy position based on the distance sensed with the distance sensor.

18. The method of claim 17, wherein the first spring has a first spring constant and the second spring has a second spring constant which is greater than the first spring constant.

19. The method of claim 11, wherein the foot pedal comprises a control arm and a footpad.

20. The method of claim 19, wherein the sensor assembly comprises a first spring and first distance sensor operatively coupled to the footpad and a second spring and a second distance sensor operatively coupled to the control arm.

* * * * *